Patented Apr. 11, 1944

2,346,441

UNITED STATES PATENT OFFICE 2,346,441

PROCESS FOR SEPARATING GAS MIXTURES

Samuel B. Lippincott, Terre Haute, Ind., assignor to Commercial Solvents Corporation, Terre Haute, Ind., a corporation of Maryland No Drawing. Application February 14, 1941, Serial No. 378,959

9 Claims. (Cl. 260—644)

My invention relates to the separation of hydrocarbon and nitrogen oxide constituents of gas mixtures, and especially from the gaseous reaction products of the vapor phase nitration of hydrocarbons.

The separation of gas mixtures containing nitrogen oxides, saturated hydrocarbons, and unsaturated hydrocarbons, presents many difficulties. Explosive mixtures of the various components, or explosive mixtures of air and these components, are encountered in many separation methods, and very unstable reaction products may be formed during the separation operations. These difficulties are of very practical significance in processes for nitrating saturated hydrocarbons, since it is desirable to recover nitrogen oxides and unreacted hydrocarbons from the gaseous reaction products of such processes.

Saturated hydrocarbons, and especially the paraffins of low molecular weight, may be successfully nitrated in the vapor phase, for example, in accordance with the procedures of U. S. Patents 1,967,667, 2,071,122, and 2,206,813, of H. B. Hass et al., and U. S. Patents 2,161,475, and 2,164,774, of G. K. Landon. In accordance with these procedures, the hydrocarbon is mixed with nitric acid or nitrogen dioxide, preferably having a considerable molar excess of hydrocarbon, and the resulting mixture is passed through a heated reaction chamber. The reaction products include, as well as nitroparaffins, unreacted paraffin hydrocarbons, olefins, nitrogen oxides, and carbon oxides. In all cases there is a substantial proportion of nitric oxide in the gaseous reaction products, and it is evident that recovery of this nitric oxide, for conversion to nitrogen dioxide or nitric acid, is economically desirable. It is also desirable to recover unreacted paraffins for recycling in the process.

The separation of the hydrocarbons and nitrogen oxide constituents of the gaseous reaction products can, of course, be attempted in two ways, i. e., first removing the saturated hydrocarbons from the mixture, or first removing the nitric oxides from the reaction mixture. The former procedure appears more desirable from the standpoint of simplicity of operation, since the unreacted saturated hydrocarbons could apparently be recovered simply by compression and liquefaction. An attempt to carry out this process, however, resulted in a very serious explosion. Further invenstigation indicated that very unstable compounds were always formed in this operation, and this procedure was therefore abandoned in favor of methods involving the removal of nitric oxide from the gaseous reaction products prior to the removal of saturated hydrocarbons.

The separation processes involving first removing nitric oxide from the reaction products, however, have had a number of disadvantages. Absorption of nitric oxide by ferrous sulfate solutions, for example, entails serious corrosion difficulties, and the expense of handling large volumes of scrub liquor at high temperatures or low pressures makes this procedure commercially undesirable. Processes involving the oxidation of nitric oxide and the separation of the resulting nitrogen dioxide from the gas mixtures, involve explosion hazards, or the expense of handling relatively large volumes of gases if additional gas is introduced to adjust the mixture to a non-explosive composition.

I have now discovered that the alternate method of separating saturated hydrocarbons from the gas mixture prior to separating nitric oxide, may be successfully carried out if these steps are preceded by a treatment of the gas mixture to eliminate unsaturated hydrocarbons. I have found that the unstable compounds, referred to above, are formed by the reaction of unsaturated hydrocarbons and nitrogen oxides, and that the formation of such compounds appears to be favored by liquid phase conditions. There is evidence that the unstable compounds are, at least in part, compounds of the alkylene nitrosite type, and compounds of the nitroalkylfuroxan type, but it is to be understood, of course, that my invention is not limited to any particular theory in this regard.

In accordance with my present process, the gaseous mixture is first treated by any suitable procedure to substantially eliminate unsaturated hydrocarbons. Saturated hydrocarbons may then be separated from the resulting mixture by any of the known procedures, such as compression and liquefaction, absorption in scrubbing oils, or combinations of these procedures. The nitric oxide in the remaining gas mixture may then be separated by any suitable method, or may be oxidized to nitrogen dioxide in the presence of the other constituents, and the resulting nitrogen dioxide may then be recovered, for example, by water scrubbing.

In the treatment of gaseous reaction products from the nitration of saturated hydrocarbons, it is desirable, although not necessary, to subject the gas mixture to water scrubbing, in accordance with the process of Reissue Patent No. 21,657, prior to subjecting the mixture to the process of my present invention. This water scrubbing serves to remove residual nitro-hydrocarbons, aldehydes, ketones, nitrogen dioxide, and any other water-soluble components of the mixture.

The gas mixture from such water-scrubbing operation, or any other mixture from which it is desired to separate saturated hydrocarbon and nitrogen oxide components, is then subjected to treatment to substantially eliminate the presence of unsaturated hydrocarbons. Any suitable method may be employed for this purpose, as, for example, scrubbing with concentrated sulfuric or phosphoric acids, selective hydrogenation, or absorption in solutions of salts which form complexes with unsaturated hydrocarbons. Fuming sulfuric acid may be employed to remove the unsaturated hydrocarbons, but this is somewhat undesirable since fuming sulfuric acid can attack other components of the gas mixture, to some extent. Sulfuric acid of 93–95% concentration may be employed, in which case it is usually desirable to increase the rate of absorption by the use of catalysts, such as silver sulfate, cuprous oxide, glycol sulforicinoleic ester, and other known catalysts for this absorption. Any of the salt solutions which are known to absorb unsaturated hydrocarbons may be utilized, although certain of these, such as platinum salts, are undesirably expensive for large scale operation. The hydrolyzable mercuric salts are particularly suitable for this purpose, and a saturated aqueous solution of mercuric acetate is most commonly used. The expression "absorption catalyst," appearing in certain of the appended claims, is to be construed in the light of the above disclosure as defining a catalyst capable of enhancing the absorption of unsaturated hydrocarbons.

After the unsaturated hydrocarbons have been removed or hydrogenated to saturated hydrocarbons, the saturated hydrocarbons in the resulting mixture may then be separated by any of the known procedures. A desirable method constitutes compression of the gas and liquefaction of the bulk of the saturated hydrocarbons, followed by scrubbing with kerosene, or other light oil, to remove the residual saturated hydrocarbons.

After the separation of the saturated hydrocarbons, the residual gas will comprise nitric oxide, together with such other components of the original mixture as are not removed by the separation procedures outlined above. In the case of gaseous reaction products from the nitration of saturated hydrocarbons, this residual gas mixture will usually contain carbon oxides, and traces of nitrogen. The nitric oxide can be separated from such mixtures if desired, but it is usually more advantageous to oxidize the nitric oxide to nitrogen dioxide in the presence of the remaining constituents. The resulting nitrogen dioxide can be recycled in nitration processes in which nitrogen dioxide is the nitrating agent, or can be absorbed in water to form nitric acid.

My invention may be further illustrated by the following specific example:

*Example*

The reaction products from the vapor phase nitration of propane, by means of nitric acid, are cooled to condense nitroparaffins, and the remaining gas mixture is then subjected to water scrubbing. For this purpose the gas mixture, at the nitration reaction pressure of approximately 80 pounds per square inch, is passed through a bubble-cap column at the rate of 370 cubic feet per hour (calculated at standard conditions) countercurrent to water introduced at the rate of 3 gallons per hour. The gas leaving this scrubber has approximately the following composition:

| | Per cent |
|---|---|
| Propane | 81.0 |
| Nitric oxide | 10.5 |
| Carbon dioxide | 2.5 |
| Carbon monoxide | 2.0 |
| Propylene | 2.0 |
| Ethylene | 2.0 |

This gas mixture is then passed through a scrubbing column countercurrent to sulfuric acid of 93% concentration, containing 1% silver sulfate. The sulfuric acid is introduced into the column at a rate of 2 gallons per hour, and the column is proportioned to provide a contact time of approximately 5 minutes. The gas mixture leaving this scrubber has approximately the following composition:

| | Per cent |
|---|---|
| Propane | 84.4 |
| Nitric oxide | 10.9 |
| Carbon dioxide | 2.6 |
| Carbon monoxide | 2.1 |

This gas mixture is then compressed to 500 pounds per square inch, which results in liquefaction of approximately 95% of the propane content. The liquid propane is separated from the gas in the usual manner, and the resulting gas mixture has approximately the following composition:

| | Per cent |
|---|---|
| Nitric oxide | 54.8 |
| Propane | 21.6 |
| Carbon dioxide | 13.1 |
| Carbon monoxide | 10.5 |

The nitric oxide can then be separated from this mixture, or can be oxidized to nitrogen dioxide directly, without prior separation. The residual propane can first be recovered, if desired, by scrubbing with kerosene. For this purpose the above resulting gas mixture, separated from the liquid propane, may suitably be passed through a scrubbing column countercurrent to kerosene introduced at a rate of 4 gallons per hour. The gas leaving the kerosene scrubber would then have approximately the following composition:

| | Per cent |
|---|---|
| Nitric oxide | 70.0 |
| Carbon dioxide | 16.7 |
| Carbon monoxide | 13.3 |

The nitric oxide in this gas mixture may be separated or oxidized directly, as discussed above in the case of the gas mixture separated from the liquid propane.

It is to be understood, of course, that the above example is merely illustrative, and does not limit the scope of my invention. Other equivalent methods of separating the unsaturated hydrocarbons from the gas mixture may be employed, and any of the known procedures may be utilized for separating or oxidizing the nitric oxide. Although my process is especially adapted for treating gaseous reaction products of the vapor phase nitration of the lower alkanes, as illustrated in this example, this process is also applicable to the separation of other gas mixtures containing saturated hydrocarbons, unsaturated hydrocarbons, and nitrogen oxides. It should also be understood that my process may be used in conjunction with other procedures for treating such gas mixtures, or for separating other components of such mixtures.

It is to be understood that the term eliminating unsaturated hydrocarbons in the gaseous mixture, as used herein and in the appended claims, is meant to signify either the actual physical separation of unsaturated hydrocarbons, or the transformation of unsaturated hydrocarbons into saturated hydrocarbons, which may remain in the mixture.

Now having described my invention, what I claim is:

1. In the process of separating lower alkanes and nitric oxide from gaseous reaction products derived from the vapor phase nitration of lower alkanes, the step which comprises removing the lower alkenes present by contacting said reaction products with an absorbent solution for said lower alkenes while being inert towards the non-alkene components of said reaction products, whereby the explosion hazard is eliminated.

2. In the process of separating lower alkanes and nitric oxide from gaseous reaction products derived from the vapor phase nitration of lower alkanes, the steps which comprise removing the lower alkenes present by contacting said reaction products with an absorbent solution for said lower alkenes while being inert towards the non-alkene components of said reaction products, whereby the explosion hazard is eliminated, then subjecting the remaining reaction products to temperature and pressure conditions adapted to liquefy at least part of the lower alkanes present before separation of the nitric oxide from the reaction products.

3. The process of claim 2 wherein said absorbent is a concentrated sulfuric acid solution containing an absorption catalyst capable of enhancing the absorption of said alkenes.

4. The process of claim 2 wherein said absorbent is sulfuric acid having a concentration ranging from about 93 to 95 per cent by weight.

5. The process of claim 2 wherein said absorbent is a concentrated solution of sulfuric acid containing a small amount of silver sulfate.

6. The process of claim 2 wherein said absorbent is an aqueous solution of mercuric acetate.

7. In the process of separating lower alkanes and nitric oxide from gaseous reaction products derived from the vapor phase nitration of lower alkanes, the steps which comprise scrubbing said reaction products with water, removing the lower alkenes present by contacting the reaction products with an absorbent solution for said lower alkenes while being inert towards the non-alkene components of said reaction products, liquefying the bulk of the lower alkanes present and removing the liquefied product and recovering the nitric oxide component of the resulting gases.

8. The process of claim 7 wherein, after removal of the bulk of the alkanes, residual alkanes are removed by scrubbing the remaining gases with a light hydrocarbon solvent for the alkanes.

9. In a process for the separation of propane and nitric oxide from the gaseous reaction products of the vapor phase nitration of propane, the steps which comprise first subjecting said gaseous reaction products to water scrubbing, followed by subjecting the resulting gas mixture to scrubbing with 90–95% sulfuric acid in the presence of silver sulfate, then subjecting the resulting gas mixture to temperature and pressure conditions to effect liquefaction of propane, separating the remaining gas from the liquid propane, subjecting the remaining gas to kerosene scrubbing, and recovering the nitric oxide component of the residual gas.

SAMUEL B. LIPPINCOTT.